April 16, 1940.  R. M. MacGREGOR  2,197,700
LIGHT SIGNAL FOR RAILWAYS AND THE LIKE
Filed Oct. 22, 1937
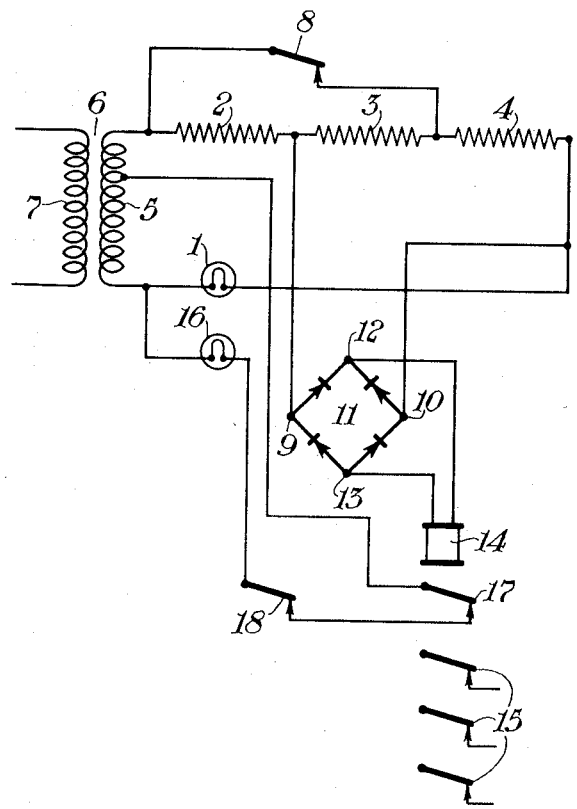
INVENTOR
Roderick Marcus MacGregor.
BY
HIS ATTORNEY Patented Apr. 16, 1940

2,197,700

UNITED STATES PATENT OFFICE 2,197,700

LIGHT SIGNAL FOR RAILWAYS AND THE LIKE

Roderick Marcus MacGregor, London, England, assignor, by mesne assignments, to The Union Switch & Signal Company, Swissvale, Pa., a corporation of Pennsylvania Application October 22, 1937, Serial No. 170,359
In Great Britain February 4, 1937

3 Claims. (Cl. 177—311)

This invention relates to light signals for railways and the like of the kind in which the source of light is constituted by an electric incandescent lamp, the circuit of which is controlled so as to render the lamp operative and thereby effect a corresponding signal indication.

In signalling systems comprising light signals of this character, it is of considerable importance to provide arrangements for proving or indicating that the lamp circuit is intact and this has hitherto been effected by means of a relay connected in or otherwise associated with the lamp circuit so as to be energized when this circuit is supplied with current, the relay being arranged, when thus energized, to operate an indicating device of any suitable type.

Such arrangements are, however, open to the disadvantage that, in the event of failure of the lamp circuit when the latter is deenergized, an indication of this failure will only be given when voltage is applied to the control circuit for the purpose of rendering the lamp operative and the invention accordingly has for its object to provide arrangements whereby any failure in the integrity of the lamp circuit will be indicated even when the signal lamp is rendered inoperative during the signalling operation.

According to the invention the lamp signal circuit is arranged to be traversed by a relatively low current during the periods when the light signal is required to be extinguished, this current being of such value as to be insufficient to render the lamp luminous, an indication or proving relay being so associated with the lamp circuit as to be traversed by substantially the same energizing current so long as the lamp circuit is intact.

In a preferred form of the invention the lamp circuit includes a resistance of such value that the current traversing this circuit is relatively small and insufficient to render the lamp operative, this current being increased to an operative value by short-circuiting a portion of this resistance by suitable control arrangements when a signal indication is to be given and the relay is so connected to points in the resistance that substantially the same voltage is impressed upon the energizing winding of the relay under either of the current conditions in the lamp circuit.

The invention is particularly applicable to light signals adapted to be controlled by the approach of a train or vehicle to the signal and, in order that the nature of the invention may be clearly understood, the invention will now be described by way of example with reference to the accompanying drawing, the single figure of which is a diagram of connections of a control and indication circuit for a light signal provided with approach control in this manner.

Referring now to the drawing it will be seen that the light signal comprises an incandescent lamp 1 connected through a resistance consisting of three series-connected sections 2, 3, 4 respectively to the secondary winding 5 of a transformer 6, the primary winding 7 of which is connected to a suitable source of alternating current. Across the second and third resistance sections 2, 3 a control circuit is connected, including a normally open approach contact 8 adapted to be closed when a train or vehicle approaches the signal, this contact being, for example, a contact of a relay associated with an approach section track circuit.

Across the resistance sections 3, 4, are connected the input terminals 9, 10 of a full-wave rectifier 11 of the bridge-connected dry surface contact type, the output terminals 12, 13 of the rectifier 11 being connected to a direct-current indication or proving relay 14 comprising contacts 15 included in any desired indication circuit, the operation of the system being as follows:

When a train or vehicle is approaching the signal the approach contact 8 is closed and the resistance sections 2, 3 are thereby short-circuited so that the circuit of the lamp 1 only includes the resistance section 4, which is so determined that under these conditions the current traversing the circuit of the lamp 1 is of the normal value required to render the lamp filament fully incandescent to give the desired signal indication. Under these conditions the voltage across the first resistance section due to the current in the lamp circuit supplies current to the input terminals of the rectifier through the second and third resistance sections in parallel with one another which are so determined that the rectified current thus supplied to the indication relay 14 is the normal current required to maintain the relay 14 energized.

So long as the lamp circuit is intact, therefore, the relay 14 will remain energized, but in the event of the lamp circuit being interrupted due to failure of the filament of the lamp 1 or otherwise, the relay 14 will be deenergized and a corresponding indication will be given.

Under normal conditions the approach contact 8 is open and the circuit of the lamp 1 then includes the three resistance sections 2, 3 and 4 so that the current in this circuit is reduced to a relatively low value, the resistance section 2 being so determined that this current is insufficient to render the lamp filament luminous. The light signal is accordingly rendered inoperative so that no signal indication is given thereby. The voltage applied to the input terminals 9, 10 of the rectifier under these conditions is evidently due to the voltage drop across the resistance sections 3 and 4 in series with one another and due to the relatively low current traversing the lamp circuit and by suitably proportioning these resistance sections the voltage can evidently be arranged to be substantially that required to supply the normal energizing current to the circuit of the relay 14 which accordingly remains energized so long as the lamp circuit is intact.

In the event, however, of failure of the lamp circuit for any reason, the indication relay 14 will become deenergized and give a corresponding indication.

It will thus be apparent that the system enables an indication to be immediately given in the event of failure of the lamp circuit whether the light signal is giving a signal indication or not.

In cases in which the light signal is provided with a reserve lamp or lamp filament as shown at 16 in the drawing which is operative in the event of failure of the main lamp 1, the indication relay 14 is provided with contacts 17 adapted, when the relay 14 is deenergized, to complete an energizing circuit for the reserve lamp or filament 16, this circuit including a corresponding approach contact 18 and being connected as shown across a suitable portion of the transformer secondary winding 5.

It will be understood that the invention may be also applied to light signals operated by direct current in which case the transformer and the rectifier for the indication or proving relay are not required. The invention is moreover not limited to the partcular system above described and illustrated by way of example which may be modified in various respects without exceeding the scope of the invention.

Having now particularly described and ascertained the nature of my said invention and in what manner the same is to be performed, I declare that what I claim is:

1. In combination, a source of current, a load, three resistors connected in a series circuit with said source and said load for supplying a checking current to said load, a normally energized voltage responsive device connected across two of said resistors, and means including a single switching device for connecting said load across said source in series with one of said resistors for supplying operating current to said load and connecting the remaining two resistors in parallel with each other and in series with said voltage responsive device across said one resistor for maintaining said voltage responsive device energized, whereby upon a failure of the circuit through said load either when supplied with said checking current or said operating current, said voltage responsive device will become deenergized to provide an indication of said failure.

2. In combination, a source of current, a load, a plurality of current limiting devices connected in a series circuit with said source and said load for supplying a checking current to said load, a voltage responsive device energized from the voltage drop across at least one of said current limiting devices due to the flow of said checking current, and means including a single switching device for connecting said load across said source in series with one of said current limiting devices for supplying operating current to said load and connecting the remaining current limiting devices in parallel with each other and in series with said voltage responsive device across said one current limiting device, whereby upon a failure of the circuit through said load either when supplied with said checking current or said operating current, said voltage responsive device will become deenergized to provide an indication of said failure.

3. In combination, a source of current, a load, a current limiting device connected in a series circuit with said source and said load for supplying a checking current to said load, a voltage responsive device energized from the voltage drop across a substantial portion of said current limiting device, and means including a single switching device for connecting said load across said source in series with a relatively smaller portion of said current limiting device for supplying operating current to said load and connecting the remaining portion of said current limiting device in parallel branches connected in series with said voltage responsive device across said relatively smaller portion of the current limiting device, whereby upon a failure of the circuit through said load either when supplied with said checking current or said operating current, said voltage responsive device will become deenergized to provide an indication of said failure.

RODERICK MARCUS MacGREGOR.